United States Patent
Sakane et al.

Patent Number: 5,364,175
Date of Patent: Nov. 15, 1994

[54] ANTI-SKID BRAKE SYSTEM FOR WHEELED VEHICLE

[75] Inventors: Shinsuke Sakane, Toyota; Hiroyuki Ichikawa, Okazaki; Satoru Fukushima, Chiryu; Chiaki Hamada, Susono, all of Japan

[73] Assignees: Aisin Seiki Kabushiki Kaisha, Kariya; Toyota Jidosha Kabushiki Kaisha, Toyota, both of Japan

[21] Appl. No.: 13,426

[22] Filed: Feb. 4, 1993

[30] Foreign Application Priority Data

Feb. 4, 1992 [JP] Japan .................. 4-019187

[51] Int. Cl.$^5$ .................. B60T 8/74; B60T 8/70
[52] U.S. Cl. .................. 303/97; 303/100; 303/106; 364/426.02
[58] Field of Search .................. 303/97, 100, 105, 106; 364/426.02

[56] References Cited

U.S. PATENT DOCUMENTS

| | | | |
|---|---|---|---|
| 3,909,071 | 9/1975 | Klatt | 303/100 X |
| 4,395,761 | 7/1983 | Sato et al. | 303/106 X |
| 4,672,547 | 6/1987 | Masaki et al. | 303/97 X |

FOREIGN PATENT DOCUMENTS

2-249752 10/1990 Japan .
3-67765 3/1991 Japan .

*Primary Examiner*—Robert J. Oberleitner
*Assistant Examiner*—Kevin D. Rutherford
*Attorney, Agent, or Firm*—Burns, Doane, Swecker & Mathis

[57] ABSTRACT

An anti-skid brake system for a wheeled vehicle including speed sensors for detecting each speed of road wheels of the vehicle and for producing an electric signal indicative of the detected speed of the road wheels, an electronic control apparatus arranged to be applied with the electric signal from the speed sensors for producing a control signal in accordance with conditions of a travel road of the vehicle in braking operation, and an electrically operated actuator arranged to be activated under control of the control apparatus for controlling a hydraulic braking pressure applied to each brake cylinder of the road wheels in response to the control signal, wherein an acceleration speed of the road wheels is calculated in response to the electric signal from the speed sensors, a stepped portion on the travel road is detected by determination of the fact that the detected speed of the road wheels becomes higher than a predetermined reference speed within a predetermined time immediately after activation of the actuator and that the calculated acceleration speed of the road wheels becomes smaller than a predetermined negative value and larger than a predetermined positive value within the predetermined time, and the actuator is deactivated upon detection of the stepped portion on the travel road.

2 Claims, 8 Drawing Sheets

ANTI-SKID BRAKE SYSTEM FOR WHEELED VEHICLE

BACKGROUND OF THE INVENTION

1. Field of the Invention

The present invention relates to an anti-skid brake system for wheeled vehicles.

2. Discussion of the Prior Art

In general, a conventional anti-skid brake system of a wheeled vehicle includes a set of speed sensors arranged to detect each rotational speed of the vehicle road wheels, an electronic control apparatus arranged to be applied with electric signals indicative of the detected speed of the respective road wheels for producing a control signal in accordance with conditions of a travel road of the vehicle, and an electrically operated actuator arranged to be activated under control of the electric control apparatus for controlling a hydraulic braking pressure applied to the wheel brake cylinders in response to the control signal. In the braking operation of the vehicle, the electric control apparatus starts to produce the control signal therefrom when the detected speed of the respective road wheels becomes lower than a reference road wheel speed while each acceleration of the road wheels becomes smaller than a predetermined negative value. If the vehicle passes over a stepped portion on the travel road during a braking operation, the road wheels are instantaneously floated from the road surface, resulting in a sudden decrease of torque acting on the road wheel tires. In such an instance, the road wheel speed becomes lower than the reference road wheel speed, and the acceleration of the road wheels becomes smaller than the predetermined negative value. As a result, the actuator is activated under control of the electric control apparatus to decrease the hydraulic braking pressure applied to the wheel brake cylinders. Accordingly, the driver experiences an unpleasant feel due to a sudden change of the vehicle deceleration during the braking operation.

To avoid such a problem as described above, Japanese Patent Laid-open Publication No. 2-249752 discloses an anti-skid control method for increasing the hydraulic braking pressure after lapse of a predetermined time in a condition where a deceleration gradient of an estimated vehicle speed at an initial control cycle is less than a predetermined value and where a period of time between low and high peaks of the road wheel speed is shorter than a predetermined time. In this control method, however, the hydraulic braking pressure would not be increased during the braking operation if the deceleration gradient of the estimated vehicle speed was higher than the predetermined value, and it would be erroneously increased if the road wheel speed greatly changed due to vibration of the driving system of the vehicle during the braking operation on a road surface of low frictional coefficient. This results in an increase of the slip rate of the road wheels during the braking operation.

SUMMARY OF THE INVENTION

It is, therefore, a primary object of the present invention to provide an anti-skid braking system for a wheeled vehicle wherein the road wheels of the vehicle can be applied with a sufficient braking force irrespectively of the vehicle deceleration when passed over a stepped portion on a travel road during the braking operation, and wherein an error in operation of the actuator during travel of the vehicle on a road surface of low frictional coefficient can be avoided.

According to the present invention, the object is accomplished by providing an anti-skid brake system for a wheeled vehicle including speed detection means for detecting each speed of road wheels of the vehicle and for producing an electric signal indicative of the detected speed of the road wheels, an electronic control apparatus arranged to be applied with the electric signal from the speed detection means for producing a control signal in accordance with conditions of a travel road of the vehicle in braking operation, and an electrically operated actuator arranged to be activated under control of the control apparatus for controlling a hydraulic braking pressure applied to each brake cylinder of the road wheels in response to the control signal, wherein the electronic control apparatus comprises first means responsive to the electric signal from the speed detection means for calculating an acceleration of the road wheels based on the detected speed of the road wheels, second means responsive to the electric signal from the speed detection means for detecting a stepped portion on the travel road by the fact that the detected speed of the road wheels becomes higher than a predetermined reference speed within a predetermined time immediately after activation of the actuator and that the calculated acceleration speed of the road wheels becomes smaller than a predetermined negative value and larger than a predetermined positive value within the predetermined time, and third means for deactivating the actuator upon detection of the stepped portion on the travel road at the second means.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
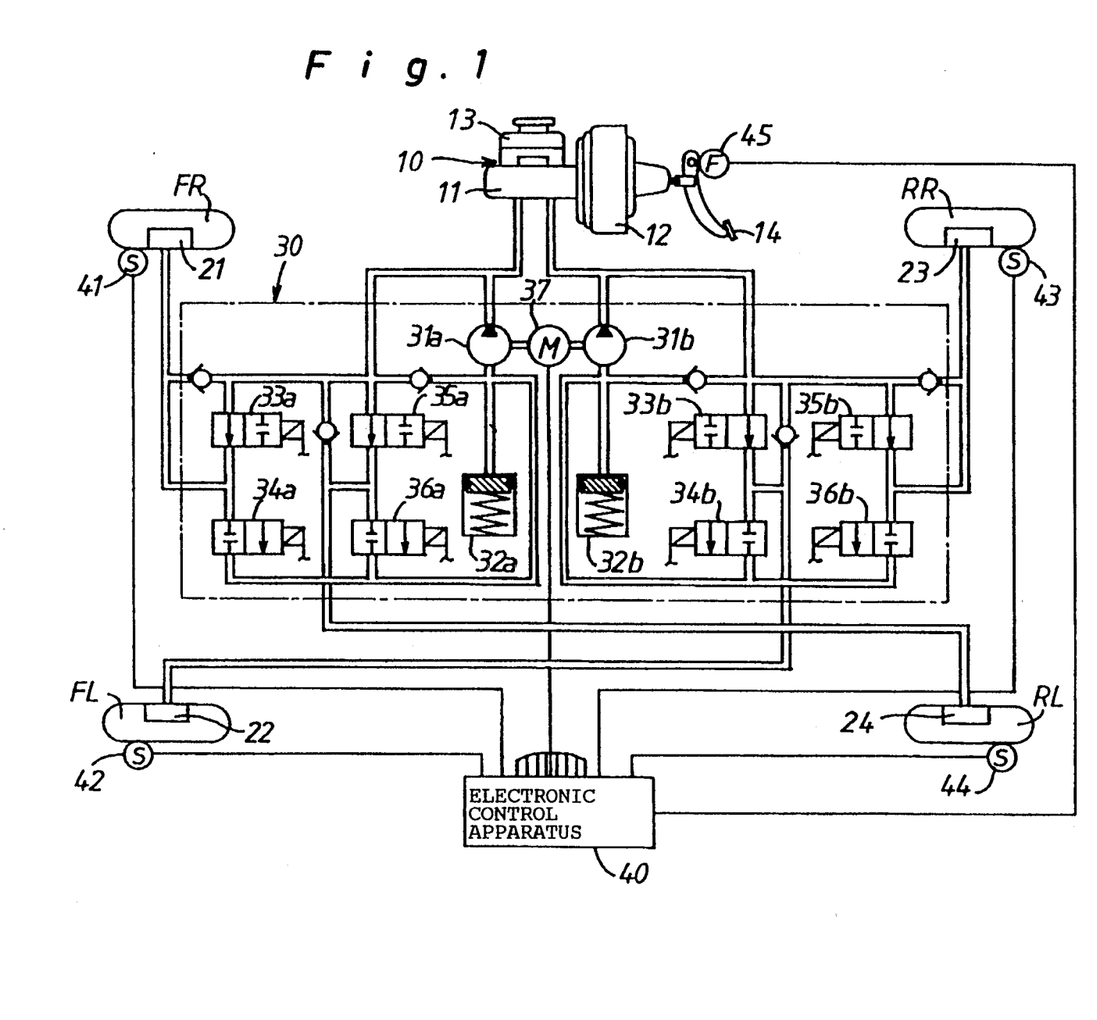
FIG. 1 is a schematic illustration of an anti-skid brake system of a wheeled vehicle.

In FIG. 1 of the drawings, there is schematically illustrated an anti-skid brake system of a wheeled vehicle which includes a master cylinder 11 provided with a booster 12 to be operated by depression of a brake pedal 14, diagonal hydraulic braking pressure circuits of the dual systems connected to brake cylinders 21, 22, 23, 24 of road wheels FR, FL, RR, RL, and an electrically operated actuator 30 arranged to be activated under control of an electronic control apparatus 40. The actuator 30 is comprised of fluid pumps 31a, 31b, reservoirs 32a, 32b and electromagntic changeover valves 33a–36a, 33b–36b disposed within the hydraulic braking pressure circuits. The fluid pumps 31a, 31b are arranged to be driven by a single electric motor 37.

Figure 2:
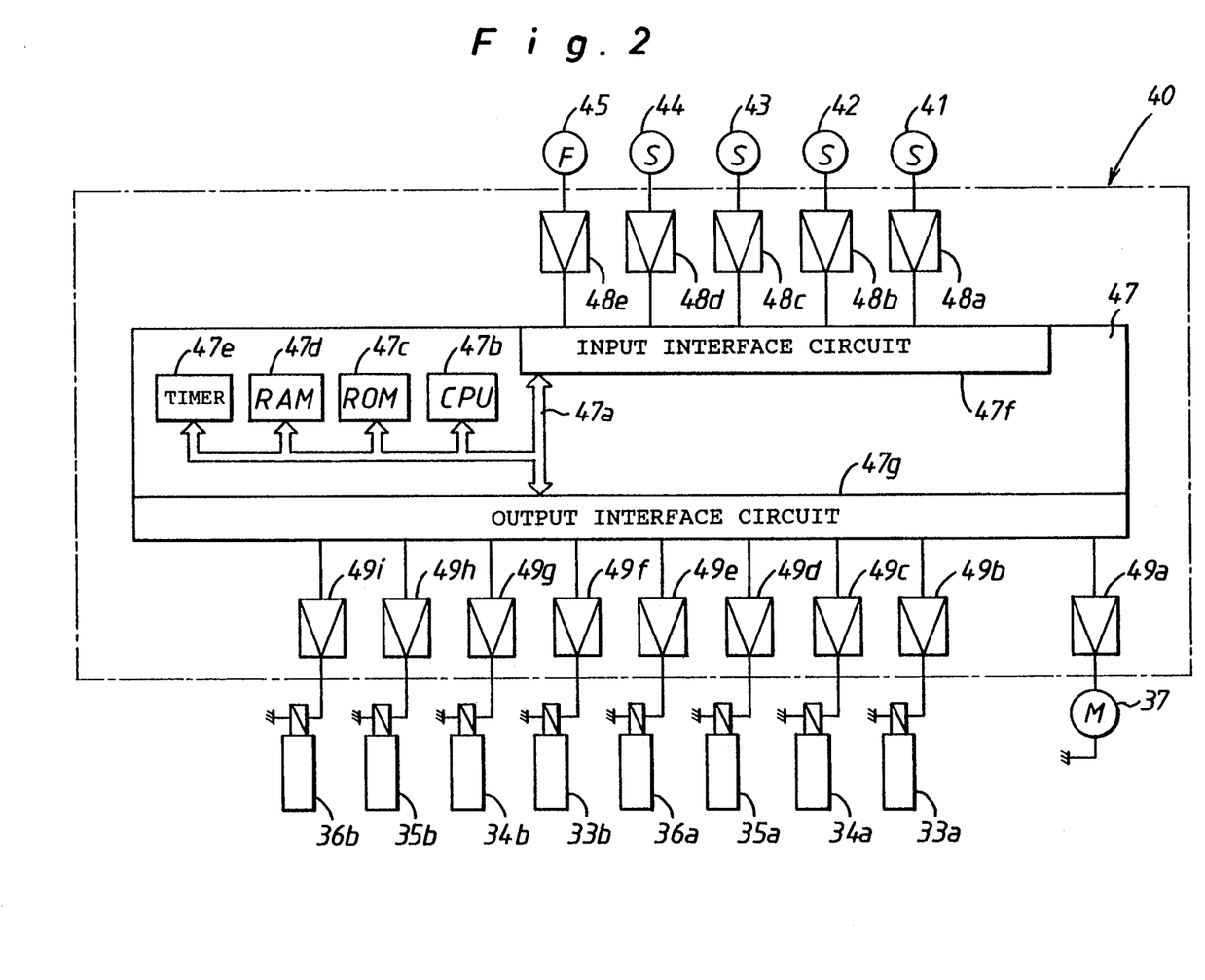
FIG. 2 is a block diagram of an electronic control apparatus for the anti-skid brake system.
Figure 3:
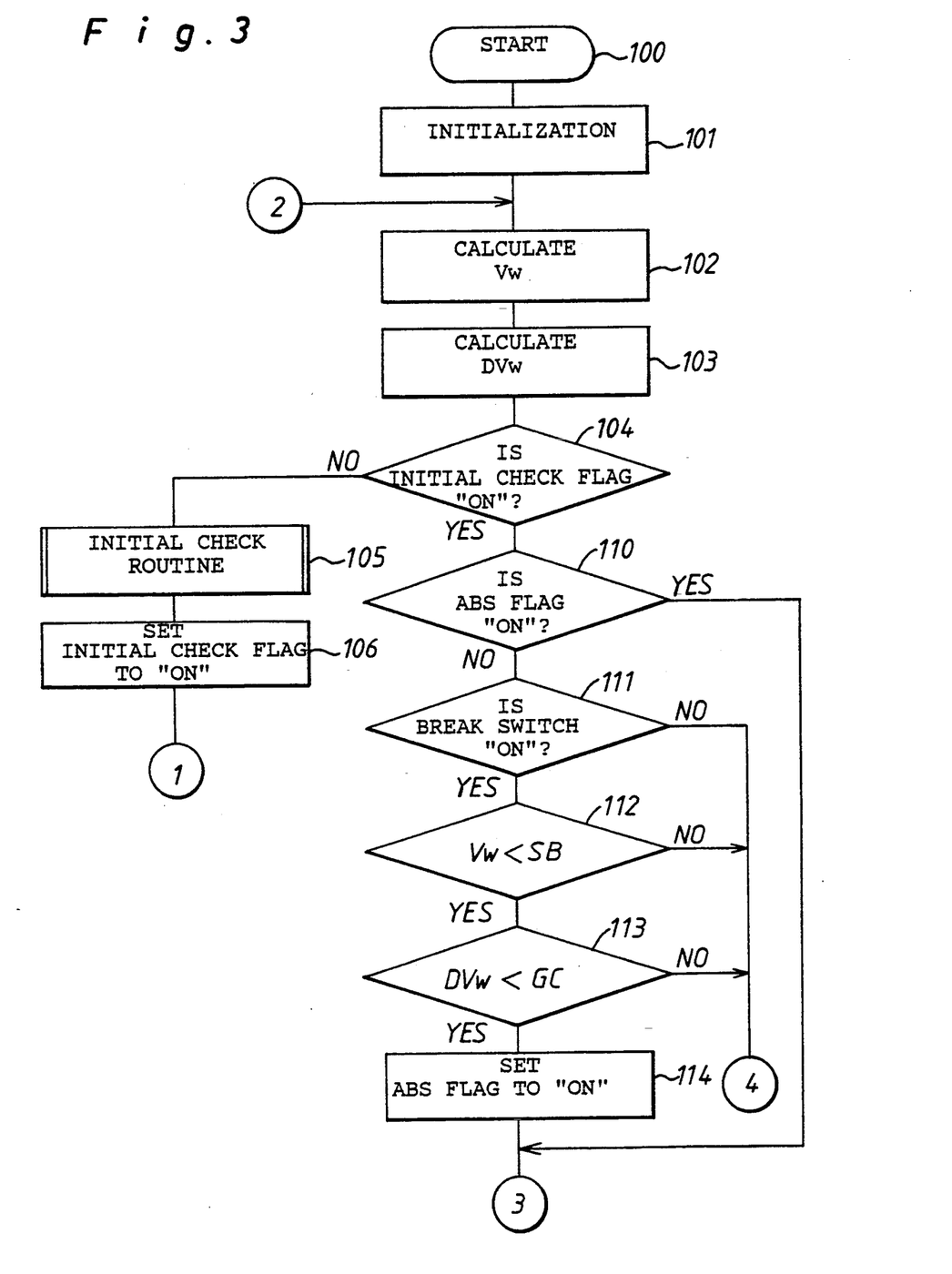
FIGS. 3, 4 and 5 illustrate a flow chart of a control program executed by a microcomputer shown in FIG. 2.
Figure 4:
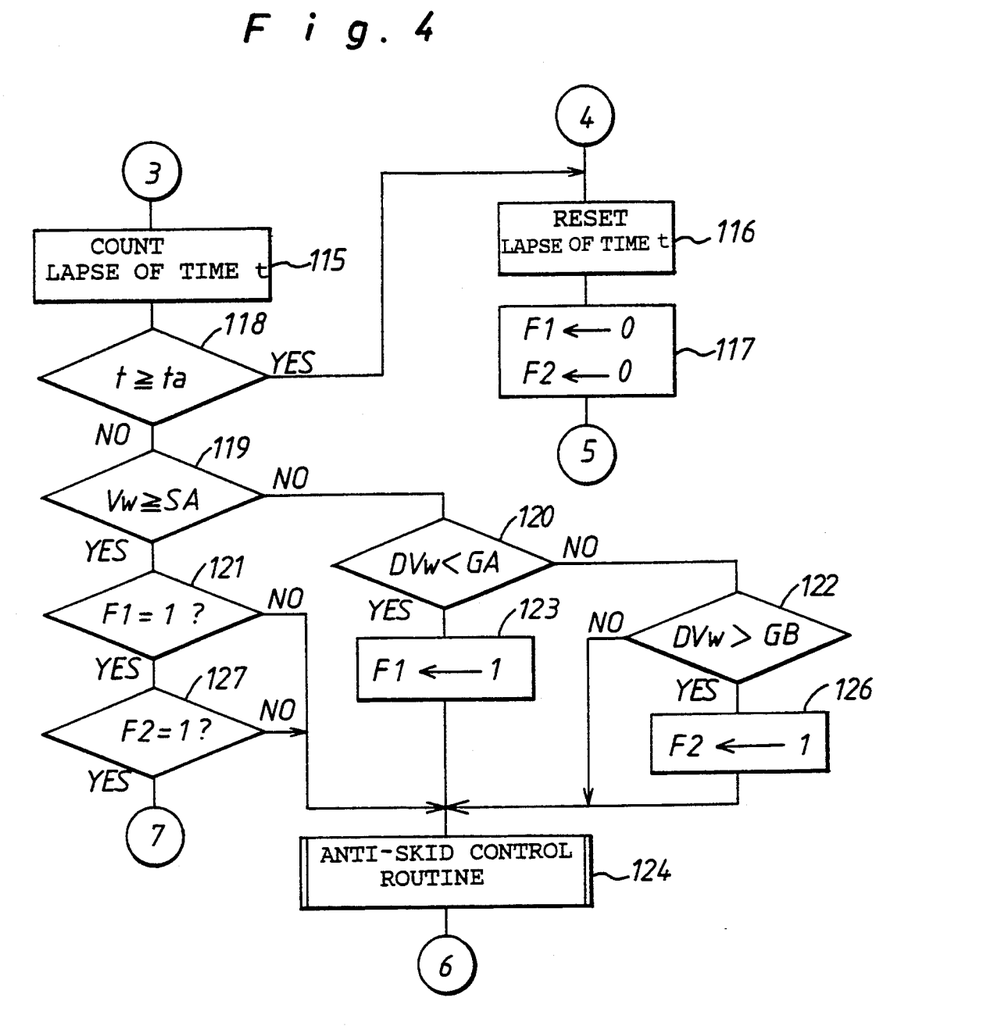
Figure 5:
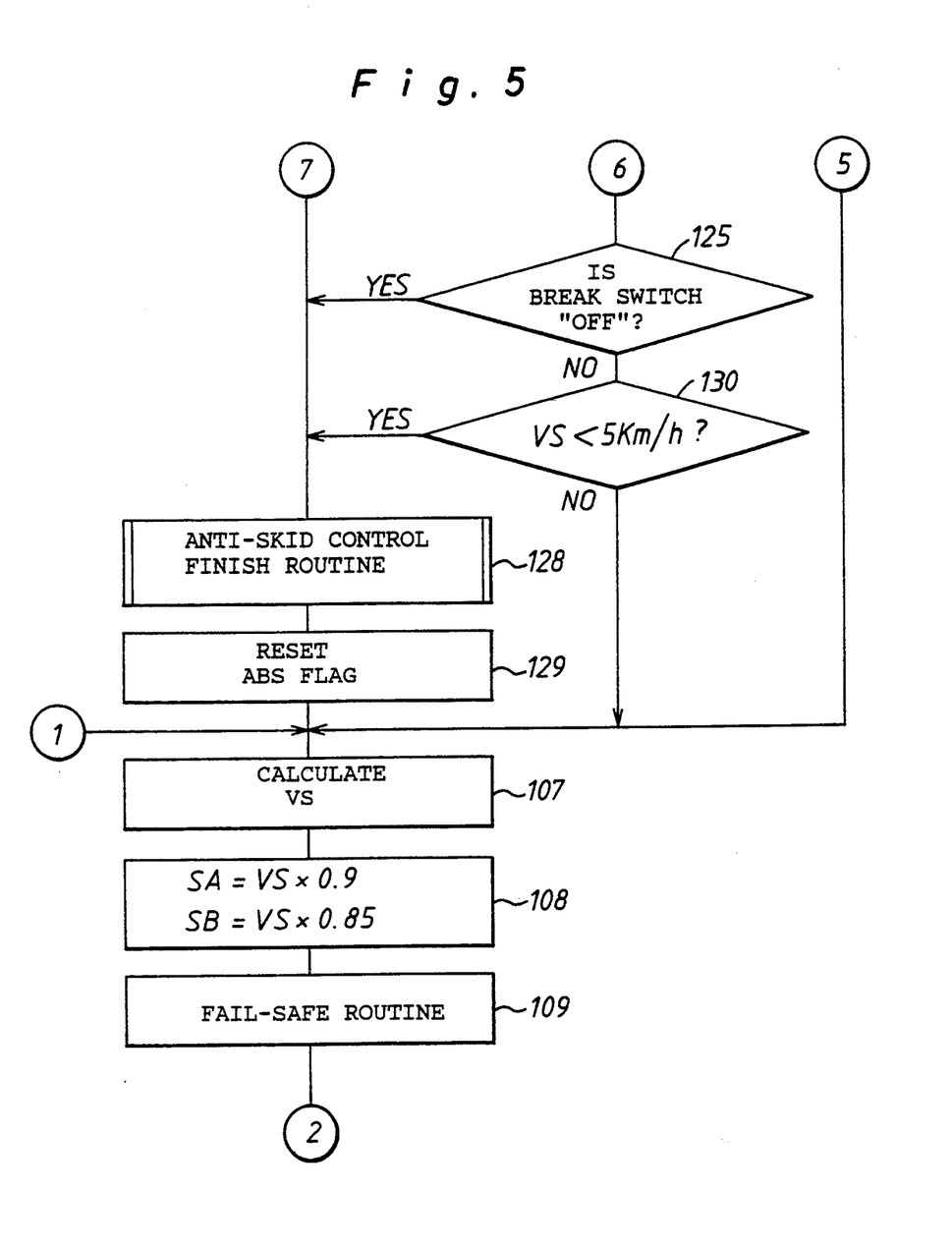

The electronic control apparatus 40 is connected to speed sensors 41, 42, 43, 44 arranged to detect the rotational speed each of the road wheels FR, FL, RR, RL and is connected to a normally open brake switch 45 arranged to be closed by depression of the brake pedal 14. Each solenoid of the changeover valves 33a–36a, 33b–36b and the electric motor are electrically connected to the electronic control apparatus 40 to be energized or deenergized in accordance with conditions of a travel road of the vehicle as described in detail later. As shown in FIG. 2, the electronic control apparatus 40 comprises a microcomputer 47 provided with a central processing unit or CPU 47b, a read-only memory or ROM 47c, a random access memory or RAM 47d, a timer 47e, an input interface circuit 47f and an output interface circuit 47g which are connected in common to a bus 47a. The input interface circuit 47f is connected to amplifiers 48a–48e which are arranged to be applied with output signals of the speed sensors 41–44 and brake switch 45, while the output interface circuit 47g is connected to driving circuits 49a–49i which are arranged to apply therethrough control signals from the microcomputer 47 to the respective solenoids of changeover valves 33a–36a, 33b–36b and the electric motor 37. The ROM 47c of computer 47 is arranged to memorize a control program shown by a flow chart in FIGS. 4 to 6, and the CPU 47b is arranged to initiate execution of the control program when an ignition switch (not shown) of the vehicle is closed. The RAM 47d is arranged to temporarily memorize variables necessary for execution of the control program.

Assuming that the ignition switch of the vehicle has been closed, the CPU 47b of computer 47 initiates execution of the control program at step 100 and initializes an initial check flag, an ABS flag, a lapse of time t and previously calculated values at step 101. Subsequently, the CPU 47b of computer 47 calculates at step 102 the rotational speed Vw of each of the road wheels on a basis of electric signals applied thereto from the speed sensors 41–44 and calculates at step 103 the acceleration DVw of each of the road wheels on a basis of the calculated speed Vw of the road wheels. At the following step 104, the CPU 47b determines whether the initial check flag is set as "ON" or not. If the answer at step 104 is "No", the program proceeds to step 105 where the CPU 47b executes an initial check routine. After execution of the initial check routine, the CPU 47b sets the initial check flag to "ON" at step 106 and causes the program to proceed to step 107 shown in FIG. 5. At step 107, the CPU 47b calculates an estimated vehicle speed VS based on the calculated road wheel speed Vw and causes the program to proceed to step 108. At step 108, the CPU 47b calculates a first reference road wheel speed SA by multiplying the estimated vehicle speed VS by a first slip rate of 0.9 and calculates a second reference road wheel speed SB by multiplying the estimated vehicle by a second slip rate of 0.85. At the following step 109, the CPU 47b executes a well known fail safe routine and returns the program to step 102.

Thus, the CPU 47b calculates the speed Vw of each of the road wheels at step 102 and calculates the acceleration speed DVw of each of the road wheels at step 103. When the program proceeds to step 104, the CPU 47b determines a "Yes" answer and causes the program to proceed to step 110. At step 110, the CPU 47b determines whether the ABS flag is set as "ON" or not. If the answer at step 110 is "No", the program proceeds to step 111 where the CPU 47b determines whether the brake switch 45 is closed or not. If the answer at step 111 is "No", the program proceeds to step 116 shown in FIG. 4. If the answer at step 111 is "Yes", the program proceeds to step 112 where the CPU 47b determines whether the road wheel speed Vw is lower than the second reference road wheel speed SB or not. If the answer at step 112 is "No", the program proceeds to step 116 shown in FIG. 4. If the answer at step 112 is "Yes", the program proceeds to step 113 where the CPU 47b determines whether the acceleration DVw of the road wheels is smaller than a predetermined negative value GC or not. If the answer at step 113 is "No", the program proceeds to step 107 shown in FIG. 5 through step 116, 117 shown in FIG. 4. If the answer at step 113 is "Yes", the program proceeds to step 114 where the CPU 47b sets the ABS flag to "ON" and causes the program to proceed to step 115 for counting a lapse of time t. In such execution of the control program as described above, the "Yes" answer respectively at step 112 and 113 means a condition for initiating anti-skid control of the road wheels.

At step 115, the CPU 47b starts to count or measure a lapse of time t and causes the program to proceed to step 118 where the CPU 47b determines whether the lapse of time t is equal to or more than a predetermined time ta. If the lapse of time t exceeds the predetermined time ta, the program proceeds to step 116 where the CPU 47b resets the lapse of time t and causes the program to proceed to step 117. At step 117, the CPU 47b sets a first acceleration flag F1 to "0" and sets a second acceleration flag F2 to "0". In this embodiment, the first acceleration flag F1 is adapted to represent the fact that the acceleration DVw of the road wheels has decreased to a predetermined negative value GA smaller than the predetermined negative value GC, while the second acceleration flag F2 is adapted to represent the fact that the acceleration speed DVw of the road wheels has increased more than a predetermined positive value GB.

When the lapse of time t is less than the predetermined time ta, the CPU 47b determines a "No" answer at step 118 and causes the program to proceed to step 119. At step 119, the CPU 47b determines whether the road wheel speed Vw is equal to or more than the first reference road wheel speed SA or not. If the answer at step 119 is "No", the program proceeds to step 120 where the CPU 47b determines whether or not the acceleration DVw of the road wheels is smaller than the predetermined negative value GA. If the answer at step 120 is "No", the program proceeds to step 122 where the CPU 47b determines whether the acceleration DVw of the road wheels is larger than the predetermined positive value GB or not. If the answer at step 120 is "Yes", the program proceeds to step 123 where the CPU 47b sets the first acceleration flag F1 to "1" and causes the program to proceed to step 124 for an anti-skid control routine. If the answer at step 122 is "No", the CPU 47b causes the program to proceed to step 124 for the anti-skid control routine. If the answer at step 122 is "Yes", the program proceeds to step 126 where the CPU 47b sets the second acceleration flag F2 to "1" and causes the program to proceed to step 124. At step 124, the CPU 47b executes the anti-skid control routine for energizing or deenergizing the solenoids of changeover valves 33a–38a, 33b–36b and the electric motor 37 in accordance with a locking condition of the road wheels thereby to increase or decrease the hydraulic braking pressure applied to the wheel brake cylinders 21–24 for preventing the road wheels from locking during the braking operation.

If the answer at step 119 is "Yes", the program proceeds to step 121 where the CPU 47b determines whether the first acceleration flag F1 is "1" or not. If the answer at 121 is "No", the program proceeds to step 124 for the anti-skid control routine. If the answer at step 121 is "Yes", the program proceeds to step 127 where the CPU 47b determines whether the second acceleration flag F2 is "1" or not. If the answer at step 127 is "No", the program proceeds to step 124 for execution of the anti-skid control routine. If the answer at step 127 is "Yes", the program proceeds to step 107 through step 128 and 129 shown in FIG. 6. In this instance, the CPU 47b finishes the execution of the anti-skid control routine at step 128 for deactivating the actuator 30 and resets the ABS flag at step 129. When the program proceeds to step 125 from step 124, the CPU 47b determines whether the brake switch 45 is turned off or not. If determines a "Yes" answer at step 125, the CPU 47b causes the program to proceed to step 128 for finishing the execution of the anti-skid control routine. If the answer at step 125 is "No", the program proceeds to step 130 where the CPU 47b determines whether the estimated vehicle speed VS is lower than 5 Km/h or not. If determines a "Yes" answer at step 130, the CPU 47b causes the program to proceed to step 128 for finishing the execution of the anti-skid control routine. If the answer at step 130 is "No", the CPU 47b causes the program to proceed to step 107 for calculation of the estimated vehicle speed VS based on the calculated road wheel speed Vw.

From the above description, it will be understood that during travel of the vehicle the CPU 47b repeatedly executes processing at step 102, 103, 104, 110 and 111 after processing at step 100 to 106 and 107 to 109. When the brake pedal 14 is in a released position during such travel of the vehicle, the CPU 47b repeatedly executes processing at step 102, 103, 104, 110, 111, 116, 117, 107, 108 and 109. When the brake pedal 14 is depressed to close the brake switch 45, the CPU 47b executes processing at step 112 in addition to processing at the above steps.

Figure 6:
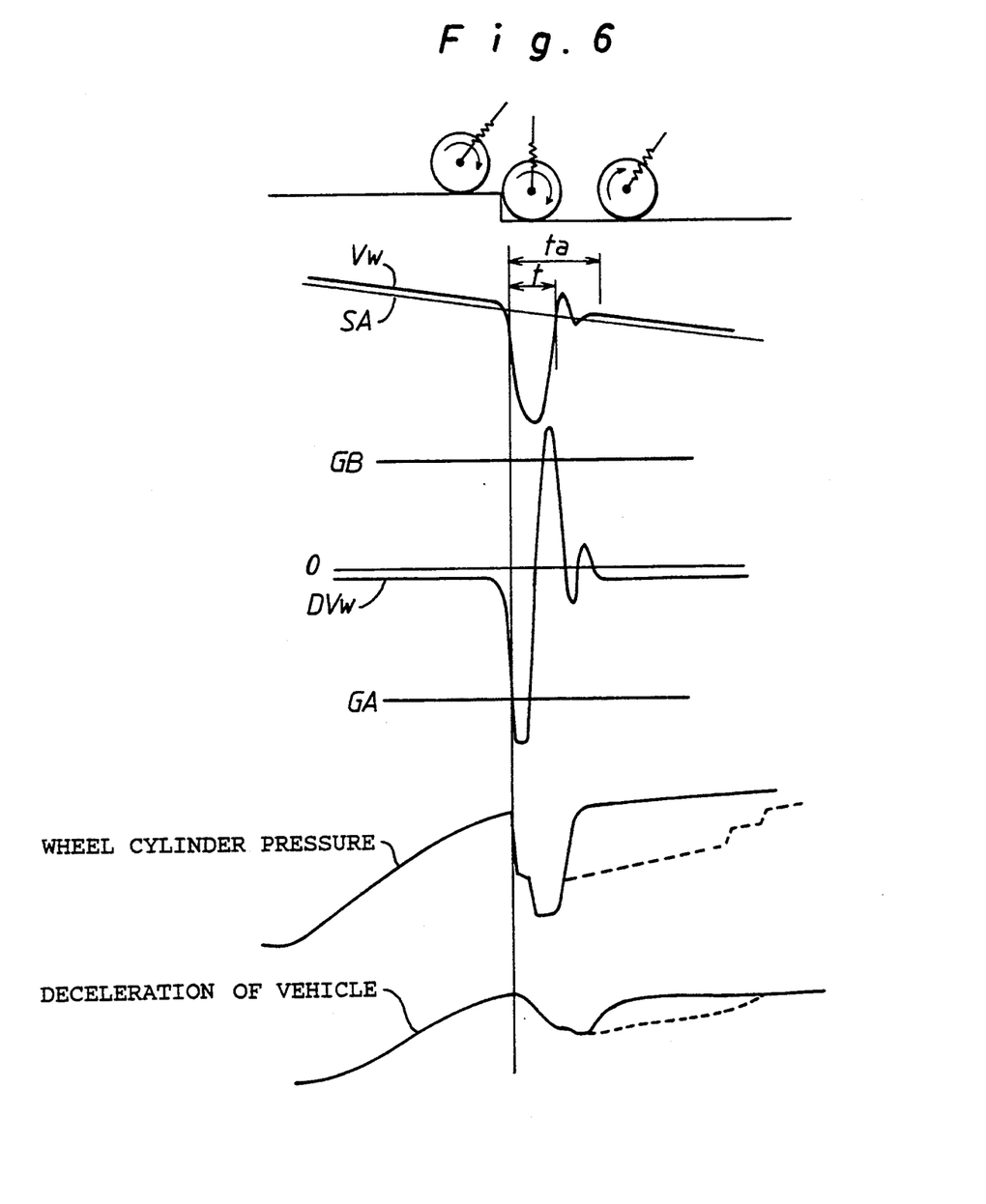
FIG. 6 is a graph showing a braking condition of the vehicle passing over a stepped portion on a road surface of high frictional coefficient.

Assuming that as illustrated in FIG. 6, the vehicle has passed over a stepped portion on a road surface having a high frictional coefficient during a braking operation, the road wheels of the vehicle are instantaneously floated from the road surface to cause a sudden decrease of torque acting on the road wheel tires. In this instance, the road wheel speed Vw becomes lower than the second reference road wheel speed SB, and the acceleration DVw of the road wheels becomes smaller than the predetermined negative value GC. Thus, the CPU 47b determines a "Yes" answer respectively at step 112 and 113 and causes the program to proceed to step 124 for execution of the anti-skid control routine through step 114, 115, 118, 119, 120 and 122, 126 or 123. This is effective to activate the actuator 30 for controlling the hydraulic braking pressure applied to the wheel brake cylinders. After execution of the anti-skid control routine at step 124, the CPU 47b executes processing at step 125, 130, 107, 108, 109 and processing at step 102, 103, 104, 110, 115, 118, 119.

Under such control of the hydraulic braking pressure, the road wheel speed Vw becomes higher than the first reference road wheel speed SA before lapse of the predetermined time ta, while the acceleration DVw of the road wheels becomes smaller than the predetermined negative value GA and larger than the predetermined positive value GB. When the road wheel speed Vw becomes equal to the first reference road wheel speed SA, the CPU 47b determines a "Yes" answer respectively at step 119, 121, 127 and executes processing at step 128 and 129. As a result, the anti-skid control of the road wheels is rendered ineffective to increase the hydraulic braking pressure so that the road wheels are applied with a sufficient braking force immediately after passing over the stepped portion on the travel road. In case the anti-skid control of the road wheels was maintained when the vehicle passed over the stepped portion on the travel road, the wheel brake cyclider pressure and the deceleration of the vehicle would be controlled as shown by broken lines in FIG. 6.

Figure 7:
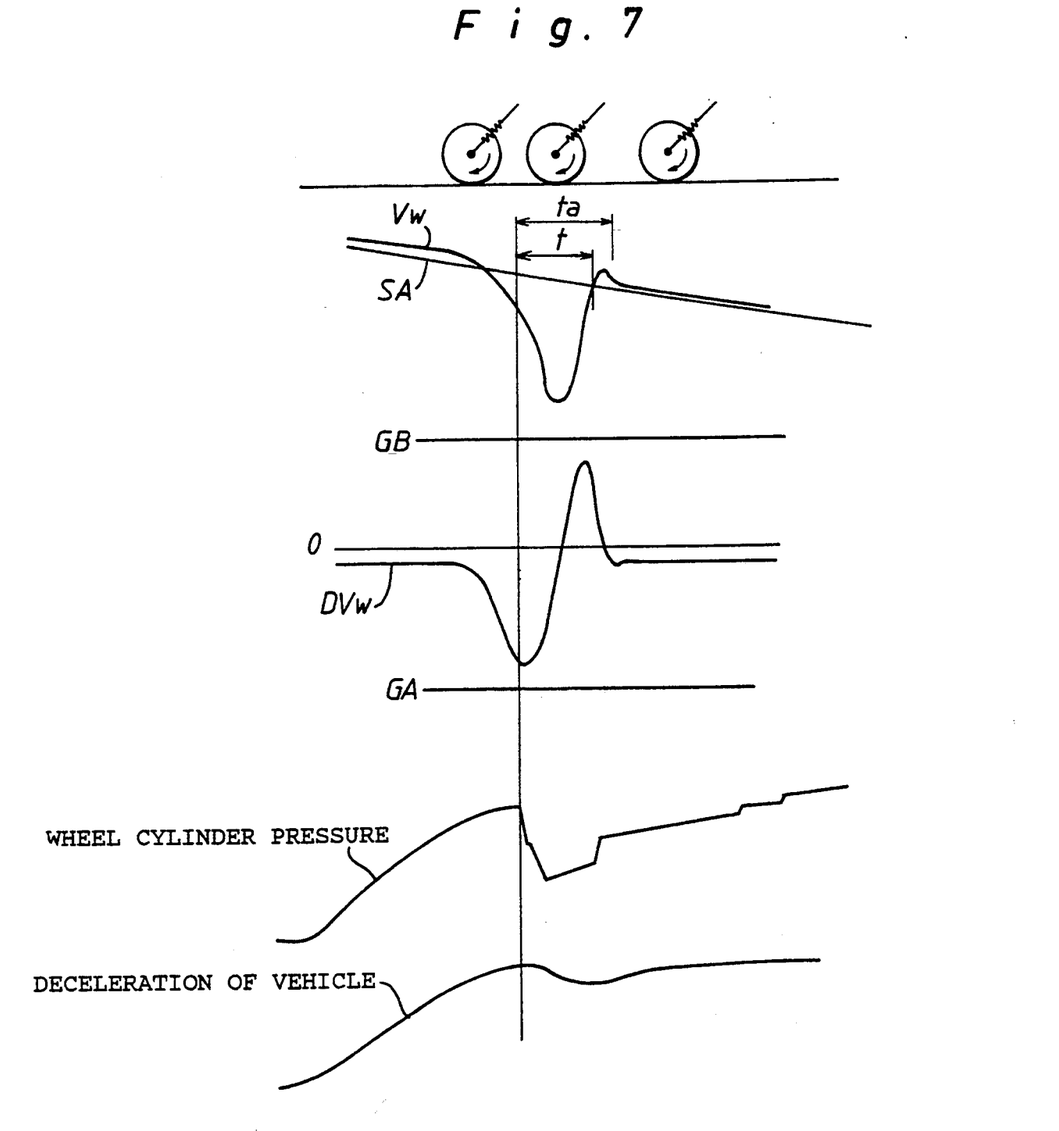
FIG. 7 is a graph showing a braking condition of the vehicle on a flat road surface of high frictional coefficient.

During the braking operation of the vehicle on a flat road surface road of high frictional coefficient as shown in FIG. 7, the road wheel speed Vw becomes lower than the second reference road wheel speed SB, and the acceleration DVw of the road wheels becomes smaller than the predetermined negative value GC. In this instance, the CPU 47b determines a "Yes" answer respectively at step 112, 113 and causes the program to proceed to step 124 for execution of the anti-skid control routine through step 114, 115, 118, 119, 120 and 122, 126 or 123. This is effective to activate the actuator 30 for controlling the hydraulic braking pressure applied to the wheel brake cylinders. After execution of the anti-skid control routine at step 124, the CPU 47b executes processing at step 125, 130, 107, 108, 109 and processing at step 102, 103, 104, 110, 115, 118 and 119.

Under such control of the hydraulic braking pressure, the road wheel speed Vw becomes higher than the first reference road wheel speed SA before lapse of the predetermined time ta, while the acceleration DVw of the road wheels does not become smaller than the predetermined negative value GA and larger than the predetermined positive value GB. When the road wheel speed Vw becomes equal to the first reference road wheel speed SA, the CPU 47b determines a "Yes" answer at step 119 and causes the program to proceed to step 124 for execution of the anti-skid control routine through step 121. Thus, the actuator 30 is maintained in its activated condition under control of the computer 47 for normal control of the hydraulic braking pressure.

Figure 8:
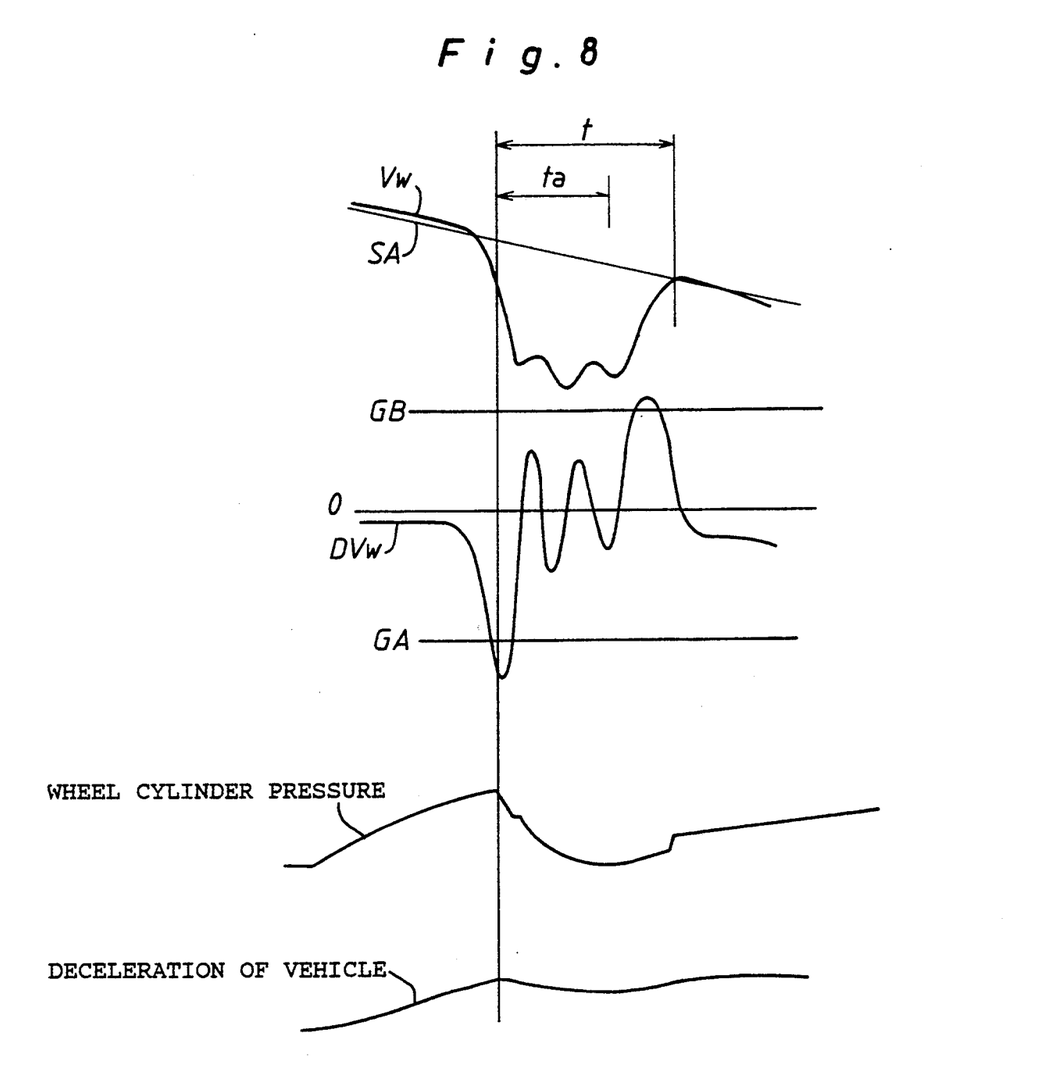
FIG. 8 is a graph showing a braking condition of the vehicle on a flat road surface of low frictional coefficient.

During the braking operation of the vehicle on a flat road surface of low frictional coefficient as shown in FIG. 8, the road wheel speed Vw becomes lower than the second reference road wheel speed SA, and the acceleration speed DVw of the road wheels becomes smaller than the predetermined negative value GC. In this instance, the CPU 47b determines a "Yes" answer respectively at step 112, 113 and causes the program to proceed to step 124 for execution of the anti-skid control routine through step 114, 115, 118, 119, 120 and step 122, 126 or 123. This is effective to activate the actuator 30 for controlling the hydraulic braking pressure applied to the wheel brake cylinders. After execution of the anti-skid control routine, the CPU 47b executes processing at step 125, 130, 107, 108, 109 and processing at step 102, 103, 104, 110, 115, 118, 119.

Under such control of the hydraulic braking pressure, the road wheel speed Vw does not become higher than the first reference road wheel speed SA before lapse of the predetermined time ta even If the road wheel speed Vw greatly changes due to vibration of the driving system such as the vehicle engine and speed reduction mechanisms, while the acceleration DVw of the road wheels does not become larger than the predetermined positive value GB before lapse of the predetermined time ta even if it has been decreased smaller than the predetermined negative value GA. Thus, the CPU 47b determines a "Yes" answer at step 118 upon lapse of the predetermined time ta and causes the program to proceed to step 116 for resetting the lapse of time t. At the following step 117, the CPU 47b resets the first and second acceleration flags F1 and F2 respectively to "0". When the road wheel speed Vw becomes equal to the first reference road wheel speed SA before lapse of the predetermined time ta, the CPU 47b determines a "Yes" answer at step 119 and causes the program to proceed to step 121. In this instance, the CPU 47b determines a "No" answer at step 121 and causes the program to proceed to step 124 for execution of the anti-skid control routine. Thus, the actuator 30 is maintained in its activated condition under control of the computer 47 for normal control of the hydraulic braking pressure.

From the above description, it will be understood that during execution of the control program the stepped portion on the travel road is detected by determination of the fact that the acceleration DVw of the road wheels during a braking operation becomes smaller than the predetermined negative value GA and becomes larger than the predetermined positive value GB within the predetermined time ta. With such a detection method as described above, the stepped portion on the travel road can be detected during a braking operation without any error irrespective of the deceleration gradient of the vehicle, and the anti-skid control of the hydraulic braking pressure is finished upon detection of the stepped portion on the travel road to apply a sufficient braking force to the road wheels. Even if the acceleration DVw or the road wheels greatly changes due to vibration of the driving system during a braking operation on a travel road having a low frictional coefficient, the acceleration DVw does not become smaller than the predetermined negative value GA and larger than the predetermined positive value GB within the predetermined time ta. Accordingly, it is able to avoid an error in detection of the stepped portion on the travel road.

What is claimed is:

1. An anti-skid brake system for a wheeled vehicle having road wheels and a brake cylinder associated with each road wheel, comprising speed detection means for detecting a speed of the road wheels of the vehicle and for producing an electric signal indicative of the detected speed of the road wheels, an electronic control apparatus which receives the electric signal from said speed detection means for producing a control signal in accordance with conditions of a travel road of the vehicle during a braking operation, and an electrically operated actuator that is actuable under control of said control apparatus for controlling a hydraulic braking pressure applied to each brake cylinder of the road wheels in response to the control signal, said electronic control apparatus comprising:

first means responsive to the electric signal from said speed detection means for calculating an acceleration of the road wheels based on the detected speed of the road wheels;

second means responsive to the electric signal from said speed detection means for detecting a stepped portion on the travel road by determining that the detected speed of the road wheels has become higher than a predetermined reference speed within a predetermined time immediately after activation of said actuator and that the calculated acceleration of the road wheels has become smaller than a predetermined negative value and larger than a predetermined positive value within the predetermined time; and third means for deactivating said actuator upon detection of the stepped portion on the travel road by said second means.

2. A control method of an anti-skid brake system for a wheeled vehicle having road wheels and a brake cylinder associated with each road wheel, the system including speed detection means for detecting a speed of the road wheels of the vehicle and for producing an electric signal indicative of the detected speed of the road wheels, an electric control apparatus which receives the electric signal from said speed detection means for producing a control signal in accordance with conditions of a travel road of the vehicle during a braking operation, and an electrically operated actuator that is actuable under control of said control apparatus for controlling a hydraulic braking pressure applied to each brake cylinder of the road wheels in response to the control signal, the method comprising the steps of:

a) calculating an acceleration of the road wheels based on the detected speed of the road wheels in response to the electric signal from said speed detection means;

b) detecting a stepped portion on the travel road by determining that the detected speed of the road wheels has become higher than a predetermined reference speed within a predetermined time immediately after activation of said actuator and that the calculated acceleration of the road wheels has become smaller than a predetermined negative value and larger than a predetermined positive value within the predetermined time; and c) deactivating said actuator upon detection of the stepped portion of the travel road.

* * * * *